(No Model.) 2 Sheets—Sheet 1.
A. LEWIS.
FEED TROUGH.
No. 555,781. Patented Mar. 3, 1896.
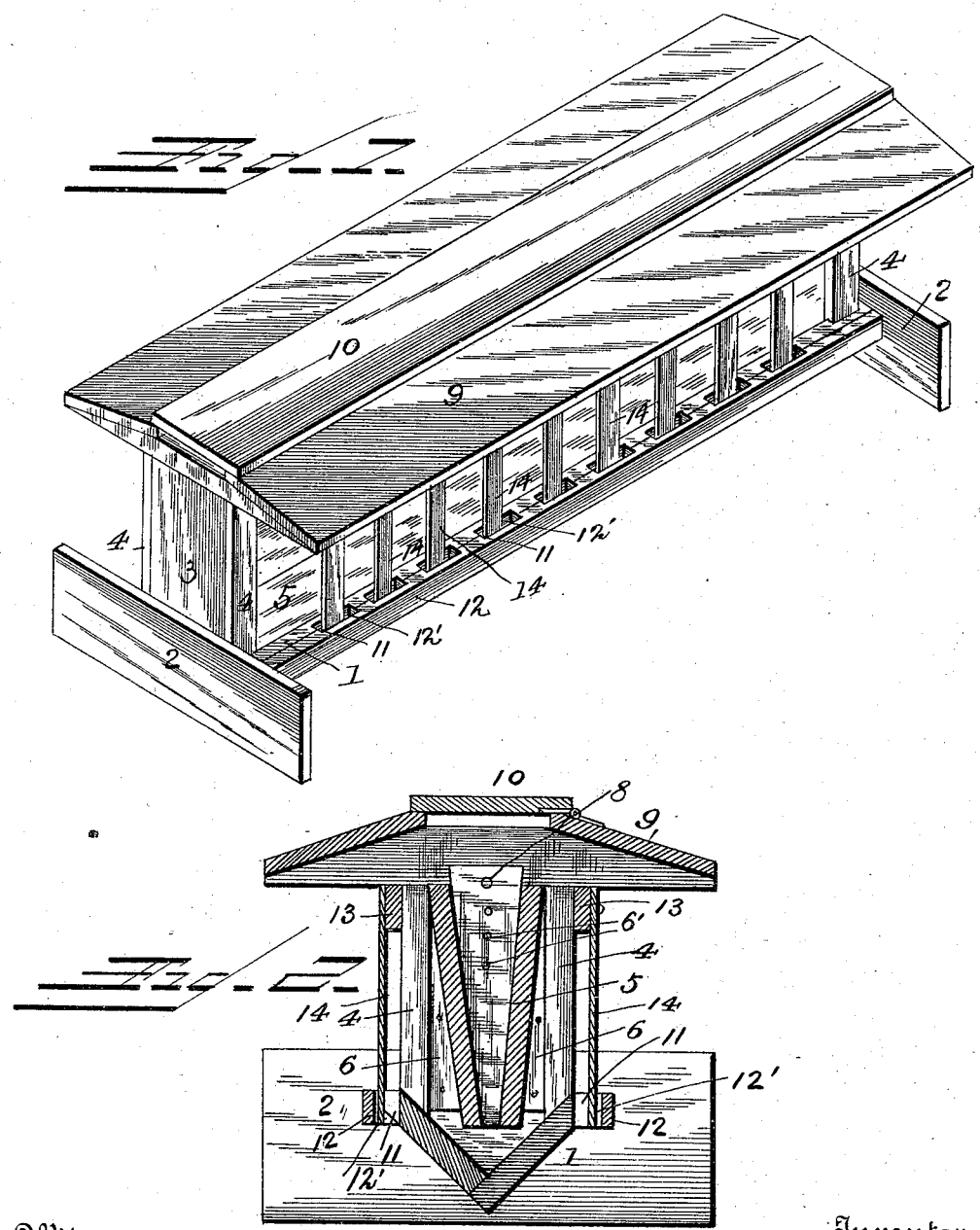
Witnesses
F. L. Ogirand
A. S. Smith
Inventor
Alvin Lewis
By H. Olverson
Attorney (No Model.) 2 Sheets—Sheet 2.

A. LEWIS.
FEED TROUGH.

No. 555,781. Patented Mar. 3, 1896.

Witnesses
F. L. Ourand
A. P. Suit

Inventor
Alvin Lewis
By H. B. Willson
Attorney

UNITED STATES PATENT OFFICE.

ALVIN LEWIS, OF NORA SPRINGS, IOWA.

FEED-TROUGH.

SPECIFICATION forming part of Letters Patent No. 555,781, dated March 3, 1896.

Application filed August 15, 1895. Serial No. 559,401. (No model.)

*To all whom it may concern:*

Be it known that I, ALVIN LEWIS, a citizen of the United States, residing at Nora Springs, in the county of Floyd and State of Iowa, have invented certain new and useful Improvements in Feed-Troughs; and I do declare the following to be a full, clear, and exact description of the invention, such as will enable others skilled in the art to which it appertains to make and use the same.

My invention relates to feed-troughs.

The object of the invention is to provide a feed-trough for the purpose of feeding small as well as large animals, and which shall be so constructed as to prevent the waste of food and the animals wallowing in the trough.

With these objects in view the invention consists in certain features of construction and combination of parts which will be hereinafter fully described and claimed.

Figure 3:
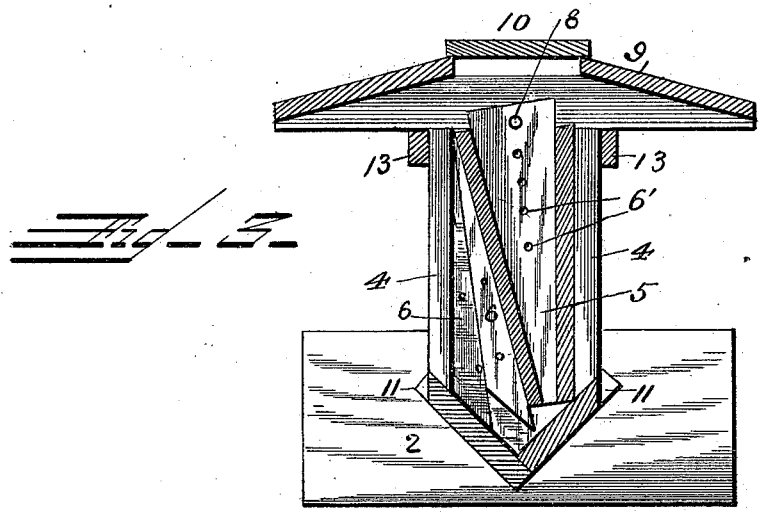
Figure 4:
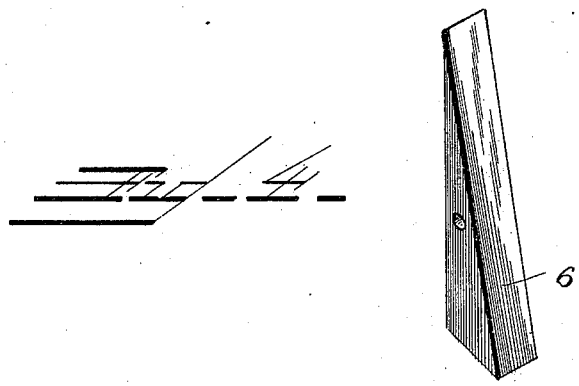

In the accompanying drawings, Figure 1 is a perspective view of my improved feed-trough with the cover in place. Fig. 2 is a vertical cross-sectional view. Fig. 3 is a similar view showing the trough canted or swung to one side and the stanchions removed. Fig. 4 is a detail perspective view of one of the blocks for retaining the triangle in its canted position.

1 denotes the trough proper supported by the end sills 2.

3 denotes vertical end pieces, at the edges of which are secured or formed cleats 4. The hopper 5 is placed between these cleats and triangular blocks 6, having outwardly-projecting pins to engage openings in the end pieces 3. These triangular blocks 6 are fitted between the inclined sides of the hopper and the cleats, as shown in Fig. 2.

In order to increase or diminish the flow or passage of feed through the open bottom of the hopper into the trough, I provide means for allowing of a vertical adjustment of the hopper—namely, I make a series of holes 6' in the ends of the hopper and arrange them in vertical order. Should I desire to increase the supply of feed, I raise the hopper as high as desired and then insert pins 8 in the lower holes, the outer ends of the pins being supported by the vertical end pieces 3, thus supporting the hopper a greater distance above the trough and allowing an increased amount of feed to flow through its bottom opening.

9 denotes a cover which fits snugly on top the hopper and is provided with a hinged slat 10, covering an opening through which the feed is supplied into the hopper.

The upper edges of the trough are formed with recesses 11 and strips 12 are secured to the sides of the trough and are provided with registering recesses 12'.

13 denotes strips secured to the upper ends of the cleats, and 14 denotes stanchions pivoted to said strip and having their lower ends arranged in said recesses 11 and 12'.

It will be seen that in a feed-trough so constructed, animals, such as hogs, will be prevented from wallowing in the feed and the stanchions will prevent them from disturbing one another. In feeding large stock it is necessary to allow more room for the animal to get to the feed. By adjusting the hopper vertically and removing the triangular blocks from one side of the hopper and placing them on the other side thereof, as shown in Fig. 3, the hopper may then be canted or swung to one side, as shown, and held in that position, thus allowing of the feeding of the larger animals.

From the foregoing description, taken in connection with the accompanying drawings, the operation and advantages of my invention will be readily seen.

The trough can be manufactured at a small cost, is simple of construction, durable in use and is not only well adapted for the feeding of animals, but may also be employed for feeding fowls.

Having thus described my invention, what I claim, and desire to secure by Letters Patent, is—

In a feed-trough for feeding large and small stock, the combination with the trough supported by end sills connected by vertically-recessed horizontal lower strips and provided with end pieces each having a vertically-disposed row of pin-holes opening inwardly, longitudinal strips secured to the upper ends of supporting-cleats, stanchions pivoted at their upper ends to the upper longitudinal strips and having their lower ends adapted to swing in the recesses of the horizontal lower strips, the hopper having pin-holes and pins for adjusting it vertically above the trough, and the triangular blocks provided with pins for engaging openings in the end pieces of the supporting-frame, substantially as specified.

In testimony whereof I affix my signature in presence of two witnesses.

ALVIN LEWIS.

Witnesses:
K. E. ALCUTT,
B. F. HIENSTEDT.